United States Patent
Pérez Salmerón et al.

(10) Patent No.: US 11,772,971 B2
(45) Date of Patent: Oct. 3, 2023

(54) NITRIC ACID PRODUCTION PROCESS AND PLANT WITH OXYGEN SUPPLY UNIT

(71) Applicant: STAMICARBON B.V., Sittard (NL)

(72) Inventors: Carmen Pérez Salmerón, Eindhoven (NL); Aldo Maria Iaquaniello, Frankfurt am Main (DE); Joey Dobree, Maastricht (NL); Maria Paz Muñoz López, Maastricht (NL)

(73) Assignee: STAMICARBON B.V., Sittard (NL)

( * ) Notice: Subject to any disclaimer, the term of this patent is extended or adjusted under 35 U.S.C. 154(b) by 0 days.

(21) Appl. No.: 18/245,254

(22) PCT Filed: Jul. 15, 2022

(86) PCT No.: PCT/NL2022/050418
§ 371 (c)(1),
(2) Date: Mar. 14, 2023

(87) PCT Pub. No.: WO2023/287294
PCT Pub. Date: Jan. 19, 2023

(65) Prior Publication Data
US 2023/0257268 A1 Aug. 17, 2023

(30) Foreign Application Priority Data
Jul. 15, 2021 (EP) .................................. 21185890

(51) Int. Cl.
*C01B 21/40* (2006.01)
*C01C 1/04* (2006.01)
(Continued)

(52) U.S. Cl.
CPC .............. *C01B 21/40* (2013.01); *B01D 53/18* (2013.01); *B01J 8/0278* (2013.01); *B01J 8/0285* (2013.01);
(Continued)

(58) Field of Classification Search
CPC ....... C01B 21/40; C01C 1/0405; B01D 53/18; B01J 19/245; B01J 8/0285; B01J 2208/00504
See application file for complete search history.

(56) References Cited

U.S. PATENT DOCUMENTS 3,927,182 A 12/1975 Powell
2013/0216461 A1* 8/2013 Suchak .................. B01D 53/78
423/210

FOREIGN PATENT DOCUMENTS

CN 106185984 A 12/2016
CN 109516445 A 3/2019
WO 2020035521 A1 2/2020

OTHER PUBLICATIONS

Thiemann et al., Ullmann's Encyclopedia of Industrial Chemistry, chapter Nitric Acid, Nitrous Acid and Nitrogen Oxides, 2012. 50 Pages.
(Continued)

*Primary Examiner* — Timothy C Vanoy
(74) *Attorney, Agent, or Firm* — Leason Ellis LLP

(57) ABSTRACT

The disclosure pertains to a nitric acid production process and plant. The process involves supplying an oxygen gas stream and ammonia feedstock to the burner section. In embodiments, a part of the tail gas stream (4) is heated in a tail gas heating section (7) and supplied to the burner section (1).

13 Claims, 2 Drawing Sheets

(51) Int. Cl.
  *B01D 53/18* (2006.01)
  *B01J 8/02* (2006.01)
  *B01J 19/24* (2006.01)
(52) U.S. Cl.
  CPC ........... *B01J 19/245* (2013.01); *C01C 1/0405* (2013.01); *B01J 2208/00504* (2013.01)

(56) References Cited

OTHER PUBLICATIONS

International Search Report for corresponding International Application No. PCT/NL2022/050418, dated Sep. 27, 2022.

* cited by examiner

NITRIC ACID PRODUCTION PROCESS AND PLANT WITH OXYGEN SUPPLY UNIT

CROSS-REFERENCE TO RELATED PATENT APPLICATIONS

This application is a U.S. National Stage Application under 35 U.S.C. § 371 of International Patent Application No. PCT/NL2022/050418 filed Jul. 15, 2022, which claims the benefit of priority of European Patent Application No. 21185890.7 filed Jul. 15, 2021, both of which are incorporated by reference in their entireties. The International Application was published on Jan. 19, 2023, as International Publication No. WO/2023/287294 A1.

FIELD

The invention pertains to the production of nitric acid by oxidation of $NH_3$ feedstock.

INTRODUCTION

Nitric acid (NA) is industrially produced by the catalytic combustion of $NH_3$ feedstock. Ullmann's Encyclopedia of Industrial Chemistry, chapter Nitric Acid, Nitrous Acid and Nitrogen Oxides, 2012, provides a general discussion of such plants and processes. The process as described therein involves three chemical steps: catalytic combustion of ammonia with atmospheric oxygen to yield NO, oxidation of the NO product to $NO_2$ and absorption of the nitrogen oxides in water to yield nitric acid as liquid stream and tail gas. Ammonia—air mixtures are used for the catalytic combustion.

A nitric acid plant typically comprises a burner section comprising an ammonia oxidation catalyst, a cooling/condensation section, an absorption section with a liquid outlet for a nitric acid stream and a gas outlet for tail gas. The absorption section typically is an absorption column. Typically also oxidation takes place in the column. An example dual pressure plant is described in WO 2018/052304.

A challenge is that the tail gas from the absorber contains nitrogen oxides (NOx) and venting this gas stream is environmentally not desirable and typically cleaning treatment of the tail gas to remove the NOx is necessary. Various approaches to reduce tail gas NOx levels are used in practice, such as improved absorption, chemical scrubbing, adsorption, and catalytic tail gas reduction (see e.g. Ullmann's Nitric Acid, para. 1.4.2.3). However, meeting the modern stringent environmental restrictions on NOx emissions remains challenging. The tail gas treatment also increases capital expenditure (equipment costs) and operation expenses of the plant and process.

US3927182A describes a nitric acid production process employing an oxygen make-up gas having a molecular oxygen content of about 90 to 99 volume percent as a source of oxygen supply for the process, and recycling at least about 40 volume % of the tail gas. In the process, a substantial decrease in the amount of nitrogen oxides vented to the atmosphere is said to be obtained. FIG. 2 of US'182 shows that if oxygen supply gas is used with at least 90 mol % $O_2$, more than 90% of the tail gas is recycled. A part of the tail gas is purged directly to a stack and vented.

The $NH_3$ feedstock for the NA production plant originates from an $NH_3$ production plant wherein $H_2$ and $N_2$ are reacted to form $NH_3$. In many existing plants and processes the $H_2$ feedstock for the $NH_3$ production originates from a synthesis gas plant based on steam reforming of hydrocarbon feedstock, in particular based for example on steam methane reforming. Steam reforming of hydrocarbon feedstock requires extensive heating and typically involves significant $CO_2$ emissions.

CN106185984A describes a water vapor electrolytic process based system for joint production of ammonia and nitric acid.

CN109516445A describes a closed-cycle technique for preparing nitric acid through combination of water electrolysis and air separation.

There is generally a desire to reduce $CO_2$ emissions in chemical industry, also for $NH_3$ production including $H_2$ feedstock production (green hydrogen'). There is also a trend to use electricity e.g. from solar power, hydro power of wind power for feedstock production. A challenge is that solar power and wind power are fluctuating energy sources.

There remains a desire for improved nitric acid production plants and processes. For instance it is desired to provide nitric acid production plants and processes that can be coupled in a flexible way with upstream production processes and plants using electricity. There is also a desire for methods of modifying existing nitric acid plants so as to benefit from green $NH_3$ production.

SUMMARY

The invention pertains in a first aspect to a nitric acid production process carried out in a nitric acid production section, wherein the nitric acid production section comprises a burner section, a cooling/condensation section and an absorption section having an outlet for a tail gas stream, the process comprising: a) providing an oxygen gas stream comprising at least 90 vol. % $O_2$ from one or more oxygen supply units; b) supplying said oxygen gas stream and ammonia feedstock to said burner section; and c) wherein at least a part, preferably a first part, of said tail gas stream is heated in a tail gas heating section to give a heated tail gas stream and supplied to said burner section.

The invention also pertains to a nitric acid production plant comprising a nitric acid production section comprising a burner section, a cooling/condensation section and an absorption section having an outlet for a tail gas stream, wherein the nitric acid production plant further comprises a first flow line for tail gas from said absorption section to an inlet of said burner section through at least one heater of a tail gas heating section, and an oxygen gas stream supply line from one or more oxygen supply units to said burner section, and a second flow line for tail gas from said absorption section to a tail gas treatment section.

The invention also pertains to a method of modifying an existing nitric acid production plant, the existing nitric acid production plant comprising a burner section, a cooling/condensation section, an absorption section having an outlet for a tail gas stream, a tail gas heating section and a flow line for tail gas from said absorption section to a tail gas treatment section, and optionally an air supply line comprising an air compressor to said burner section; the method comprising adding to said plant: a flow line for tail gas from said absorption section to an inlet of said burner section through at least one heater of a tail gas heating section; and an oxygen gas stream supply line from one or more oxygen supply units to said burner section; preferably giving a nitric acid production section.

Figure 1:
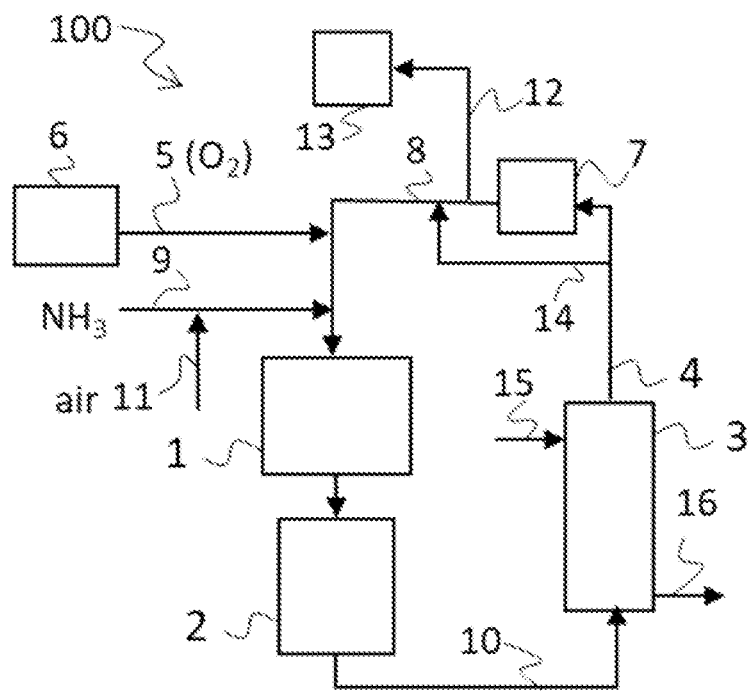
FIG. 1 schematically illustrates an example process scheme according to the invention.

Any embodiments illustrated in the figures are examples only and do not limit the invention.

DETAILED DESCRIPTION

Provided by the present disclosure is a nitric acid production plant comprising a nitric acid production section which comprises a burner section, a cooling/condensation section and an absorption section. Also provided is a nitric acid production process carried out in such a nitric acid production plant. In the process, ammonia is reacted with oxygen in the burner section using an ammonia oxidation catalyst. The effluent from the burner section is cooled in the cooling/condensation section. The effluent from the cooling/condensation section is contacted with water in the absorption section giving a liquid stream comprising nitric acid product and a tail gas stream.

The nitric acid process and plant is for instance of the dual pressure type or for instance of the mono pressure type.

In some embodiments, the nitric acid production process and plant is of the dual pressure type and the absorption section is operated at a pressure of for instance 10-14 bara. The term "dual pressure" acknowledges that the production process uses different pressures in the reactor (e.g., 4-6 bara) and in the absorption section in these embodiments. In other embodiments the plant and process are of the mono pressure type wherein the reactor and the absorption section are operated at the same pressure.

In the burner section oxygen and ammonia are reacted so as to form a burner gas stream. The burner gas stream comprises nitrogen dioxide formed by oxidation of nitrogen oxide, and further an amount of non-oxidized nitrogen oxide, nitrous oxide ($N_2O$) as a by-product, as well as possibly $N_2$ as a by-product, and water obtained from the oxidation of ammonia.

The burner section comprises in particular a reactor comprising a combustion chamber. The reactor comprises for instance a burner hood, a gas distributor, at least one catalyst gauze, or a plurality of catalyst gauzes, and optionally a basket. Typically, the reactor will comprise a combustion chamber in which a suitable catalyst is placed. Catalysts for the oxidation of ammonia are known to the skilled person, and will generally comprise a noble metal. A typical way of providing the catalyst is by means of one or more wire gauzes, such as a stack of wire gauzes, placed inside the reactor, such as in the combustion chamber. A preferred metal catalyst is a combination of platinum and rhodium, such as a pack of platinum-rhodium gauzes, e.g. produced by knitting thin wires.

A 'cooling/condensation section' as used herein comprises a gas cooling section and a condensation section, optionally combined in a single unit.

In the gas cooling section, the burner gas stream is subjected to cooling, typically by heat exchange with a cooling fluid and/or with a process stream to be heated, so as to form a cooled burner gas stream, and for instance raising steam on the cooling fluid side. The gas cooling section comprises e.g. one or more heat exchanging sections.

In the condensation section said cooled burner gas stream is subjected to condensation, so as to form a nitric acid solution and an uncondensed nitrogen oxides (NOx) gas stream.

In the absorption section the nitrogen oxides gas stream is subjected to absorption in water so as to form a raw nitric acid product stream and a tail gas comprising mainly $N_2$, some nitrogen oxides such as $NO_x$ (nitrogen oxide and nitrogen dioxide) nitrous oxide ($N_2O$ and any excess oxygen). Preferably in this section the gas is provided with a residence time allowing NO to be further oxidized into $NO_2$. The absorption section is for instance an absorption/oxidation column.

The absorption section for instance comprises an inlet connected to a liquid outlet of the cooling/condensation section, and an inlet connected to a gas outlet of the cooling/condensation section, an inlet for water, a liquid outlet for a nitric acid stream and a gas outlet for tail gas. The liquid nitric acid stream is for instance supplied to a bleaching section.

Downstream of the reactor, optionally via additional equipment such as a unit for the oxidation of nitric oxide to nitrogen dioxide, a gas cooling section is provided. Said unit for oxidation can, e.g. function by providing residence time to the NOx gas allowing NO to convert into $NO_2$. The gas cooling section has a gas inlet which is in fluid communication (directly or indirectly) with the outlet for burner gas of the reactor. The gas cooling section can have a conventional set-up, e.g. comprising one or more shell and tube heat-exchangers. For instance the gas cooling section comprises one or more heat exchangers which are configured so as to have a heat transfer contact, through a wall, between the gas stream resulting from the chemical conversion in the plant (i.e., the process gas stream) and a service medium and/or a process stream to be heated. The service medium is typically water or steam, generally provided as a separate flow system or circuit in the plant. Such a heat exchanger using water or steam as cooling fluid is referred as a steam circuit heat exchanger. The gas cooling section comprise for instance one or more of such steam circuit heat exchangers and optionally one or more other heat exchangers. The heat exchange to the steam circuit will generally be used to generate superheated steam, and the one or more heat exchangers are sometimes also referred to as a superheater. In a preferred embodiment, the gas stream from the burner is cooled by a steam superheater. The generated steam is used e.g. for driving rotating equipment, for example an air compressor (and/or nitrogen oxides compressor) and/or for steam export. In certain embodiments, the process and plant are of the dual pressure type and a $NO_x$ compressor is for instance used.

In an interesting embodiment, the gas cooling section further comprises a heat exchanger which is a steam evaporator for raising steam and a heat exchanger which is an economizer. The steam evaporator and the economizer are in particular a part of the so-called steam circuit.

In some embodiments, the cooling section comprises a tail gas heater, wherein the tail gas heater is a heat exchanger between process gas stream (burner gas) to be cooled and tail gas to be heated.

The process gas stream being cooled as a result of heat exchangers, the output of the gas cooling section is referred to as cooled burner gas, for which the gas cooling section has a gas outlet which is in fluid communication, directly or indirectly, with the next downstream section, viz. a condensation section.

The condensation section thus has a gas inlet which is in fluid communication with the outlet for cooled burner gas of the gas cooling section. In the process of production of nitric acid on the basis of the oxidation of ammonia, the gas stream resulting from the oxidation, i.e. the burner gas, will necessarily comprise water, as is formed as a result of the reaction of ammonia and oxygen. It will be understood that, in water, nitrogen dioxide forms nitric acid. The condensation section is configured to allow this to happen by subjecting the cooled burner gas, which comprises water vapor, to condensation. This condensation results in an aqueous nitric acid condensate, which is typically called weak nitric acid. With reference to the conditions for condensing water vapours, it will be understood that the kinds and amounts of gases that do not participate in the formation of the aqueous nitric acid condensate, will remain in the gas phase. This refers particularly to the uncondensed nitrogen oxides comprising any excess nitrogen dioxide, nitric oxide, comprising nitric oxide formed in the reaction between nitrogen dioxide and water, as well as any non-oxidized nitric oxide originally present, and nitrous oxide. The condenser accordingly has a liquid outlet for the aqueous nitric acid condensate and a gas outlet for the uncondensed nitrogen oxides gas stream. The condensation section can be a conventional condensation apparatus, e.g. a shell-and tube condenser.

In an interesting embodiment, the process and plant are of the dual pressure type and the condensation section comprises a low pressure condensation section and a high pressure condensation section wherein the nitrous gas stream leaving the low pressure condensation section is compressed prior to feeding to the high pressure condensation section.

Preferably an expander is used. The expander is associated with a compressor, for instance with an air compressor and/or with a compressor that serves to increase the pressure in the condensation section in a dual pressure process. Accordingly, the low-pressure condensation section comprises a tail gas heater and a low-pressure cooler/condenser. In an example embodiment, process gas is supplied from a steam evaporator to a heat exchanger for heat exchanging contact with tail gas to be heated and subsequently supplied to a separate heat exchanger using cooling water.

The nitrogen oxides stream leaving the low-pressure section is sent to a high-pressure condensation section via a compressor in this dual pressure embodiment. This compressor (nitrogen oxides compressor) is placed downstream of the gas cooling section (the low pressure cooling/condensing section) and upstream of the high pressure condensation section, the terms downstream and upstream referring to the process gas stream. The high-pressure condensation section of the dual pressure process and plant comprises a high-pressure nitrogen oxides gas cooler and a high-pressure cooler/condenser. The acid product stream leaving the high-pressure condensation section is sent to the absorption/oxidation section.

In order to complete the formation of nitric acid also on the basis of the excess nitrogen dioxide not condensed with water, the nitrogen oxides gas stream obtained from the condenser, in particular from the high pressure condenser in the dual pressure process, is subsequently subjected to absorption in a suitable aqueous liquid. Prior to the absorption the gas is preferably given residence time allowing further oxidation of NO into $NO_2$. The aqueous liquid can be water as such, but it can also be a dilute nitric acid solution. In the latter case, as a result of the absorption of nitrogen dioxide, the dilute nitric acid solution will become a more concentrated nitric acid solution. Preferably, the heat of absorption is removed by cooling water, typically on the trays of an absorption column. The absorption is conducted in the absorption section. This section has, accordingly a gas inlet which is, directly or indirectly, in fluid communication with the gas outlet of the condensation section. It will be understood that by the absorption in water nitrogen dioxide is allowed to form nitric acid.

The absorption section, which typically comprises an absorption column, preferably functions also as an oxidation section, in order to allow further nitrogen dioxide to be formed from the nitric oxide that is inevitably present, e.g. as a result of the reaction between nitrogen dioxide and water. To this end, e.g., a secondary air stream is introduced into the bleacher and oxygen-comprising gas is supplied from the bleacher to the absorption column, e.g. said gas is mixed with the nitrogen oxides gas stream obtained from the condenser.so as to re-oxidize the NO that is formed by the reaction of $NO_2$ with $H_2O$. This secondary air also removes $NO_2$ from the product acid in the bleacher. In a mono pressure embodiment, the bleacher is optionally provided as a bottom section of the absorption column.

The aqueous nitric acid condensate obtained in the condenser is fed, directly or indirectly, to the absorption section. To this end the absorption section comprises a liquid inlet which is in fluid communication with the liquid outlet of the condensation section. The absorption section, such as an absorption/oxidation section, produces a raw nitric acid product stream and a nitrogen oxides tail gas.

The tail gas comprises $NO_x$ (non-oxidized nitrogen oxide and non-reacted nitrogen dioxide) and nitrous oxide ($N_2O$). Accordingly, the absorption section comprises a gas outlet for the nitrogen oxides tail gas and a liquid outlet for raw nitric acid product stream. The raw nitric acid product stream is for instance supplied to a bleaching section.

The nitric acid plant provided in the present disclosure preferably comprises a tail gas treatment section receiving at least a part of said tail gas.

The tail gas treatment section comprises a nitrogen oxides ($NO_x$ and $N_2O$) gas removal zone, wherein the nitrous gas received at the inlet of the nitrogen oxides gas removal zone is subjected to purification so as to form a purified tail gas. The purification uses for instance a catalyst, in particular catalytic reduction. The purified tail gas is for instance subjected to expansion. The expanded purified tail gas is for instance cooled and vented into the atmosphere.

The tail gas treatment section, in particular the nitrogen oxides gas removal zone, comprises for instance an abatement reactor comprising a catalytic bed for $N_2O$ removal and a catalytic bed for $NO_x$ removal arranged in series, wherein one or more catalytic beds for $NO_x$ removal are arranged downstream of a catalytic bed for $N_2O$ removal. Such a section can be for instance used with a dual pressure process and/or a mono pressure process.

For example, the $N_2$ is converted in two stages: in the first stage, the $N_2O$ is decomposed to $O_2$ and $N_2$ with the aid of a catalyst. For example an iron zeolite catalyst is used. In the second stage, the NOx is mixed with injected $NH_3$ to produce $N_2$ and $H_2O$. For example an iron zeolite catalyst is used.

The first upstream catalyst bed is used for $N_2O$ removal. The first catalyst bed preferably receives only the tail gas.

The $N_2O$ removal catalyst bed is preferably operated with a temperature in the range of 400-490° C., for example with a dual pressure process.

The abatement reactor comprises for example one or more downstream catalyst beds used for $NO_x$ removal.

Preferably NH$_3$ is added to the tail gas downstream of a catalyst bed that is used for N$_2$O removal. The NH$_3$ can be used for NO$_x$ reduction. In some embodiments, the abatement reactor comprises an ammonia sparger downstream of the catalytic bed for N$_2$O removal and upstream of the catalytic bed for NO$_x$ removal.

In a preferred embodiment the tail gases are reacted with ammonia under the influence of a catalyst, such as a non-noble metal catalyst, according to reaction equation (1), under the formation of nitrogen and water vapor, which can be safely released into the atmosphere.

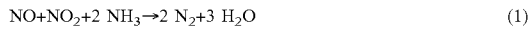

$$NO+NO_2+2\ NH_3 \rightarrow 2\ N_2+3\ H_2O \quad (1)$$

In some other embodiments, the abatement reactor comprises one bed to reduce both N$_2$O and NO$_2$, and natural gas is added to the gas stream upstream of the catalyst bed for N$_2$O removal and ammonia is added for NO$_2$ reduction. This embodiment is advantageously used with lower temperature tail gas at the abatement reactor inlet.

The expansion of the purified tail gas produces work that is generally put to use in driving a turbine (which serves, next to a steam turbine utilizing steam generated in the process, and/or a gas turbine), to drive one or more compressors. This typically refers to a preferred air compressor employed in preferably providing air to the oxidation process and/or refers to a NOx compressor of a dual pressure embodiment; these compressors can be combined as a single apparatus, or e.g. be two different sections connected to a single driveshaft.

Advantageously the abatement reactor is relatively small in some embodiments with a relatively small volume of catalyst, relative of nitric acid production capacity, by virtue of the (partial) tail gas recycle to the burner.

The process of the invention involves providing an oxygen gas stream from one or more oxygen supply units, and supplying the oxygen gas stream to the burner section, next to supplying ammonia feedstock to the burner section. The oxygen supply unit comprises preferably an electrolyser, more preferably a water electrolysis unit, wherein a H$_2$ gas stream and an oxygen gas stream are produced by electrolysis, preferably by water electrolysis, more preferably by liquid water electrolysis.

The oxygen supply unit may also comprise an air separation unit. In some embodiments, the oxygen supply units comprise both an electrolyser and an air separation unit. In some embodiments, the oxygen gas stream originates only from an electrolysis unit and the reactor also receives air.

The oxygen gas stream comprises at least 90 vol. % O$_2$, for instance at least 95 vol. % O$_2$ or at least 99 vol. % O$_2$ or at least 99.9 vol. % O$_2$. High purity oxygen may contribute to stable operation of the burner section.

As an example, a water electrolysis unit can be used to provide such a high purity oxygen gas stream. Other sources of the oxygen gas stream are also possible. For example, a Nitrogen Generation Unit may be used. For instance an air separation unit (ASU) with conditioning of the oxygen stream from the ASU is used to provide a high purity oxygen gas stream.

Suitable types of electrolysers include alkaline electrolyser, solid oxide electrolysers and proton exchange membrane (PEM) electrolyser. A compressor and/or blower may be used to compress the oxygen stream to the operating pressure of the reactor if necessary. In embodiments with a PEM electrolyser, the oxygen gas stream may be available at a pressure of e.g. 20-30 bar.

The plant preferably furthermore comprises an air supply line for supplying air to the burner. The air supply line comprises for instance an air compressor. Advantageously the recycle of at least a part of the tail gas provides for a lower load of the air compressor in the inventive process. Advantageously a highly efficient air compressor can be used. Even with low temperature of compressed air, good temperatures of the gas stream to the burner can be achieved by including at least a part of the heated tail gas stream in the gas stream to the burner.

Preferably the plant comprises means in the air supply line for adjusting the amount of air supplied to the burner, for instance by operating the air compressor.

Preferably in the process, air is supplied to the burner during at least a part of the time, e.g. continuously or during periods. This provides the advantage that in embodiments wherein the preferred water electrolysis unit uses electricity from fluctuating sources such as from solar power and/or wind power, more air can be supplied to the burner during times that the water electrolysis unit is operated at lower or zero oxygen production rates. This advantageously allows for stable operation of the plant even with fluctuating energy sources, in particular with stable pressure in the burner thereby achieving constant nitric acid strength. Oxygen comprised in the air may react with ammonia feed for example from an ammonia storage unit and/or from an ammonia plant.

In some embodiments, the nitric acid production section is capable of running both in a first mode wherein oxygen from one or more oxygen supply units, such as from a water electrolysis unit, is used and ammonia feedstock from an ammonia plant, and a second mode wherein oxygen from air is used and ammonia feedstock from an ammonia storage unit. Preferably in the second mode all oxygen supplied to the burner is provided as air. In this embodiment, the plant may provide for greater flexibility. The equipment costs may relatively higher.

In the preferred embodiment wherein a water electrolysis unit is used for providing a part or all of the of the oxygen gas stream, the hydrogen gas stream from the water electrolysis unit is preferably reacted with N$_2$ in an ammonia plant to form at least part of the NH$_3$ feedstock of the nitric acid production plant and process. Thereby advantageously both the H$_2$ stream and the O$_2$ stream from the water electrolysis unit are efficiently used in the nitric acid production, unlike concepts wherein only ammonia is produced and oxygen is vented.

Generally, the NH$_3$ feedstock of the nitric acid production is formed by reacting N$_2$ feedstock with H$_2$ feedstock in an ammonia plant. Preferably the H$_2$ feedstock is provided by water electrolysis. Preferably the N$_2$ feedstock is provided at least in part by an air separation unit (ASU), for instance a cryogenic air separation unit, or for example from a vacuum pressure swing adsorption unit using e.g. zeolite, or for example a membrane based ASU.

As used herein, the term ASU is not limited to cryogenic separation devices but also includes devices based on pressure swing adsorption and devices based on membrane separation. Broadly such devices can be referred to as Nitrogen Generation Unit.

Typically the ASU also provides an oxygen gas stream or oxygen-enriched air stream which is also supplied to the burner section of the nitric acid production section. The preferred presence of a tail gas treatment unit in the nitric acid production section may allow for processing oxygen-containing gas stream in the burner section which do not have a very high oxygen purity, such as oxygen- containing gas streams from an ASU used for N$_2$ feedstock production for the ammonia plant. The presence of the tail gas treatment unit also provides for desirable flexibility when modifying existing nitric acid production plant comprising an ammonia plant and a nitric acid production section wherein the existing ammonia plant comprises an ASU.

Preferred embodiments of the invention aim for coupling green ammonia production with nitric acid production. Accordingly $N_2$ used in the $NH_3$ production is preferably produced via an ASU and the $H_2$ feedstock for $NH_3$ production is produced via water electrolysis. The green ammonia is used as a feed for the nitric acid process and the oxygen produced from the electrolyser and the ASU is combined with the tail gas in the NA production section to create synthetic air, wherein the inlet composition to the burner (i.e. the total gas received by the burner) comprises less than 11% vol. $NH_3$.

In the process of the invention, at least a part of the tail gas stream from the absorption section is heated in a tail gas heating section. At least part of the heated tail gas is supplied to the burner section, preferably through a tail gas compression unit, such as a tail gas compressor or an ejector.

Generally, a part, but not all, of the tail gas stream is heated in a tail gas heating section and supplied to the burner section. Hence, in some embodiments all of the tail gas stream is heated and a part of the heated tail gas stream is supplied to the burner section. In some other embodiments, a part of the tail gas stream is heated and all of the heated tail gas is supplied to the burner section. In further embodiments, a part of the tail gas stream is heated and a part of the heated tail gas stream is supplied to the burner section. For instance, a second part of the tail gas stream is supplied to the burner section without heating, and/or for instance a further part of the heated tail gas stream is supplied to a tail gas treatment section.

The tail gas stream comprises e.g. at least 90 vol. % $N_2$ and e.g. less than 10 vol.% $O_2$. Thereby the heated tail gas is advantageously used for diluting the oxygen gas stream from the oxygen supply unit. This advantageously contributes to good operation of the burner.

Preferably, the inlet composition to the burner (i.e. the total gas received by the burner) comprises less than 11% vol. $NH_3$. The recycled tail gas can accordingly be used as diluent of the gas stream received by the burner.

Optionally, a tail gas compressor compresses the tail gas stream received by the compressor from a pressure of e.g. 6.5 bar to the operating pressure of the process, e.g. 8 bar, for instance in embodiments with a mono pressure process and plant. In some embodiments, an ejector is used to transport tail gas from a tail gas heater of the tail gas heating section to the burner section. The oxygen gas stream can advantageously be used as motive fluid for the ejector, in particular in case of a PEM electrolyser as source of the oxygen gas stream.

The tail gas stream may comprise $NO_x$ that is recycled at least in part to the burner in the process. This may contribute to ammonia burner efficiency. A tail gas blower is for instance used for transport of tail gas in a dual pressure process.

Ammonia feedstock is also supplied to the burner section. Preferably, the oxygen gas stream is mixed with at least a part of the heated tail gas stream upstream/prior to the mixing with the ammonia feedstock, and is optionally also mixed with one or more other gas streams, such as additionally mixed with a part of a cold tail gas stream. Preferably, the oxygen gas stream is mixed with at least a part of the heated tail gas stream to form a (first) mixed gas stream in a tail gas/$O_2$ mixing unit. The mixed gas stream has a lower oxygen concentration than the oxygen gas stream, for instance comprises less than 50 vol. % or less than 25 vol. % oxygen, for instance 20-25 vol. % oxygen. Preferably the mixed gas stream has the same oxygen content as air (21 vol. %). This very advantageously allows for the easy and flexible adjustment of the ratio between air and mixed gas stream in the feed stream to the burner. Moreover, the mixed gas stream preferably has a temperature in the range 100-200° C., so as to have substantially the same pressure as air supplied to the burner using an air compressor. This allows for flexible switching between operation with air and with the oxygen stream.

Preferably the plant comprises an $O_2$ sensor to achieve the optimum mixing ratio.

Preferably the mixed gas stream is mixed with at least ammonia feedstock and supplied to the burner section. Optionally, the process involves combining ammonia feedstock with air to give a second mixed gas stream and combining the first and second mixed gas stream and supplying the combined gas stream to the burner. In other embodiments, tail gas, $O_2$ gas stream and ammonia feed are mixed in a single mixer.

In the process according to the invention, at least a part of the tail gas that is supplied to the burner is heated. This contributes to optimum temperature of the gas streams at the burner inlet.

The gas stream at the burner inlet for instance has a temperature in the range of 160° C. to 200° C.

Very advantageously, the tail gas heating section, or at least one tail gas heater, is preferably used for heating both (simultaneously and/or consecutively) tail gas that is supplied to tail gas treatment section and tail gas that is recycled to the burner. For instance, in some embodiments the tail gas heating section, or at least one tail gas heater, is used for simultaneously heating a tail gas stream comprising both tail gas that is supplied to the tail gas treatment section and tail gas that is recycled to the burner. In other embodiments, or in combination, the tail gas heating section is used for consecutively (or subsequently) heating both tail gas that is supplied to the tail gas treatment section and tail gas that is recycled to the burner. For instance, during some periods the heated tail gas is entirely recycled to the burner and during other periods, a first part of the heated tail gas is recycled to the burner and a second part is supplied to the tail gas treatment section.

Preferably the plant comprises at least one heat exchanger for heating tail gas with a gas flow line to the burner and a gas flow line to a tail gas treatment section. In operation, gas from the heat exchanger may be supplied, directly or indirectly, to the burner, to the tail gas treatment section, or to both. In some embodiments, gas from the heat exchanger may be supplied, directly or indirectly, alternatingly to the burner, to the tail gas treatment section, or to both.

The tail gas treatment section comprises for instance one or more catalytic beds for $N_2O$ and $NO_x$ removal, for instance at least two catalytic beds. The tail gas treatment section comprises for instance an upstream (for the gas flow) catalytic bed for $N_2O$ removal, and a downstream catalytic bed for $NO_x$ removal, wherein preferably $NH_3$ is supplied as reducing agent only to the downstream catalytic bed.

The tail gas treatment section, preferably with two such catalytic beds, is for instance operated with a gas inlet temperature of at least 420° C., e.g. at least 450° C. and/or less than 550° C. Operating at such a temperature may provide the advantage that no reducing agent in the upstream catalyst bed is necessary.

The tail gas at the gas outlet of the absorber has for instance a temperature in the range of up to 60° C.

Preferably the heated tail gas stream as received by tail gas/$O_2$ mixing unit has a temperature in the range of 180° C.-200° C. Very elegantly subjecting tail gas supplied to the burner and tail gas supplied to the tail gas treatment section to combined heating could be used in a nitric acid production process meeting these temperature requirements thereby providing for efficient heating.

In particular in embodiments wherein the burner also receives air, or during periods of operating the process wherein the burner receives air and the oxygen gas stream, a first part of the tail gas is heated and supplied to the burner and a second part of the tail gas is heated and sent to the tail gas treatment section. Preferably the first and second part are both heated in the tail gas heating section.

Advantages of heating the tail gas upstream of dividing the tail gas in said first and second part include great flexibility in distributing heated tail gas to the tail gas treatment section and to the burner in various ratios.

A purified tail gas comprising $N_2$ is released from the tail gas treatment section and is vented into the atmosphere. In some embodiments a third part of the tail gas stream is not heated in the tail gas heating section and is mixed with the first part to as to achieve a desired temperature for the tail gas part supplied to the burner.

By supplying only a part of the tail gas to the tail gas treatment section, the process advantageously allows for a smaller catalyst volume for the tail gas treatment section. Reduced air intake may also contribute to lower catalyst deterioration by fewer impurities in the tail gas stream supplied to the tail gas treatment section. Advantageously total NOx emissions from the tail gas may be reduced.

Greater flexibility as to the feedstock may be obtained by using a relatively larger catalyst volume of the tail gas treatment section, if desired.

Generally, in some embodiments, the process further involves supplying a further part of the tail gas stream to the burner, wherein this part of the tail gas stream has a lower temperature than the first part/heated part of the tail gas stream. The further part of the tail gas stream may have the same temperature as the tail gas at the outlet of the absorption column (e.g. 20-40° C. or may be heated to a temperature that is lower than the temperature of the heated tail gas stream/first part.

In an embodiment, a first part of said tail gas stream is heated in a tail gas heating section to give a heated tail gas stream and supplied to said burner section, and a second part of said tail gas stream is heated in said tail gas heating section and supplied to a tail gas treatment section comprising a catalyst bed. In this embodiment, the plant comprises an air supply line for supplying air to said burner section, which advantageously increases flexibility. In this embodiment, the temperature of the heated first part of said tail gas stream is reduced, e.g. by mixing with a further part of tail gas stream, and thereafter supplied to said burner section. Preferably, the first and second part are commonly heated in one or more heat exchangers, e.g. as discussed hereinafter. For instance, a tail gas stream is divided in the first and second part downstream of a second heat exchanger, for heat exchanging against burner gas, in particular for a mono pressure plant, for example a second heat exchanger as discussed hereinafter. The tail gas stream from the second heat exchanger for instance has a temperature of at least 350° C. or at least 400° C., which advantageously is high enough for efficient catalytic tail gas treatment for the second part of the tail gas, e.g. for catalytic reduction using natural gas or methane and ammonia, more in particular with a single catalyst bed. The temperature of the first part of the tail gas is e.g. by at least 50° C. or at least 100° C., for instance by mixing with a third part of the tail gas stream, e.g. a third part of the tail gas stream that bypasses the second heat exchanger.

Hence, in a more particular preferred embodiment of the process with said first and second part, in particular for a mono pressure process, the heating in said tail gas heating section of said first part and said second part of the tail gas stream comprises heat exchange against the burner gas stream, to reach a temperature of e.g. at least 350° C., and the second part of said tail gas stream is supplied from said tail gas heating section at a temperature of at least 350° C. to the catalytic tail gas treatment section.

The tail gas heating section preferably comprises multiple heat exchangers in series, each heat exchanger having tail gas to be heated on one side and a fluid stream to be cooled on the other side. In an optional embodiment, a part of the tail gas stream is separated from the tail gas stream between two of said heat exchanger and supplied to the burner. Thereby the separated tail gas stream part may have an advantageous temperature for the gas stream supplied to the burner.

The tail gas heating section may comprise for example a first heat exchanger for heat exchange between tail gas from the tail gas outlet of the absorption column and expanded tail gas to be heated, and downstream thereof (for tail gas to be heated), a second heat exchanger for heat exchange against process gas from the burner (burner gas). Optionally a steam heater is arranged between the first and second heat exchanger. In an optional embodiment a part of the tail gas stream is separated from the tail gas stream between the first and second heat exchanger and is supplied to the burner. Optionally a part of the tail gas stream is separated from the tail gas stream between the absorber and the first heat exchanger and also supplied to the burner.

The tail gas heating section may comprise for example a first heat exchanger for heat exchange between tail gas from the tail gas outlet of the absorption column and expanded tail gas to be heated, and downstream thereof (for tail gas to be heated), a second heat exchanger for heat exchange against condensing process gas from the cooling section, and optionally downstream thereof (for tail gas to be heated), a third heat exchanger for heat exchange against process gas from the burner. Optionally a steam heater is arranged between the first and second heat exchanger. The second heat exchanger for heat exchange against condensing process gas from the cooling section is for instance used in a dual pressure embodiment. In an optional embodiment a part of the tail gas stream is separated from the tail gas stream between the first and second heat exchanger and is supplied to the burner. In an optional embodiment a part of the tail gas stream is separated from the tail gas stream between the second and the third heat exchanger and is supplied to the burner. Optionally a part of the tail gas stream is separated from the tail gas stream between the absorber and the first heat exchanger and also supplied to the burner. The tail gas stream from the third heat exchanger for instance has advantageous temperature for catalytic reduction in a tail gas treatment section.

In some embodiments with a mono pressure process and plant, at least a part of the tail gas from the absorption column is heated in one or more heat exchangers, for instance boilers, and subsequently divided in a first part supplied to the burner and a second part supplied to a tail gas treatment section, wherein the first part after being divided from the second part is cooled by heat exchange in a tail gas—tail gas heat exchanger against the tail gas stream upstream of at least one of said heat exchangers.

Controlling the temperature of the burner at the inlet to the catalytic gauzes in the burner provides the advantage of a more efficient process and preferably the use of a more efficient air compressor.

The burner is operated at a pressure in the range of e.g. 4-6 bara in embodiments with a dual pressure process and with a pressure in the range 7-10 bara, e.g. 8 bara, for a mono pressure process.

The absorption section is operated at a pressure of e.g. 5-8 bara for a mono pressure process and at a pressure of e.g. 9-12 bara for a dual pressure process. In dual pressure processes, the tail gas is typically expanded between the absorption section and the burner, for instance by a valve in the gas flow line from the absorption section to the burner. Advantageously this tail gas expansion can be used in an ejector in the oxygen gas stream supply line, for instance in case of an oxygen supply unit providing oxygen at a pressure of less than 1 bara as is the case for certain electrolysers.

Advantageously the tail gas recycle allows for higher energy recovery compared to a plant without such recycle because of lower compression power required for air compression. Furthermore $NO_x$ emissions per unit of nitric acid produced are reduced by the tail gas recycle. As a further advantage the burner catalyst is exposed to less dust and other impurities in air (even after filtration) thereby extending catalyst lifetime by the tail gas recycle.

The invention also pertains to a nitric acid production plant comprising a nitric acid production section comprising a burner section, a cooling/condensation section and an absorption section having an outlet for a tail gas stream. The NA production section comprises a first flow line for tail gas from said absorption section to an inlet of said burner section through at least one heater of a tail gas heating section and a second flow line for tail gas from said absorption section to a tail gas treatment section. The first and second flow line provide for improved flexibility of the plant, in particular for use with varying feeds of $O_2$. For instance, if more $O_2$ feed is supplied as air, more of the tail gas can be supplied to the tail gas treatment section.

The NA production section further comprises an oxygen gas stream supply line from an oxygen supply unit to the burner section. The plant is preferably suitable for the inventive nitric acid production process. The NA production section preferably further comprises an air supply line comprising an air compressor to the burner section.

The nitric acid production plant in a preferred embodiment further comprises an ammonia plant, an air separation unit and a water electrolysis unit. The water electrolysis unit has an outlet for oxygen preferably connected to said oxygen gas stream supply line and an outlet for $H_2$ connected to an inlet of said ammonia plant. The air separation unit has an outlet for $N_2$ connected to an inlet of the ammonia plant. The ammonia plant has an outlet for $NH_3$ connected to an inlet of the burner section comprised in the nitric acid production section.

The plant for example further comprises an ammonia storage unit, such as a storage tank, having an outlet connected to a supply line for ammonia feedstock to the burner. Thereby the nitric acid production section may advantageously still be operated in a stable way if the ASU and/or water electrolysis unit are operated at a lower or zero rate.

The present disclosure also provides a method of modifying an existing nitric acid production plant wherein the existing nitric acid production plant comprising a burner section, a cooling/condensation section and an absorption section having an outlet for a tail gas stream, and a tail gas heating section. The existing plant comprises a tail gas treatment section and a flow line for tail gas from the absorption section, through the tail gas heating section, to the tail gas treatment section. The existing plant comprises an air supply line to said burner section. The air supply line for instance comprises an air compressor.

The method comprises adding to said plant:
a flow line for at least a part of said tail gas stream from at least one heater of said tail gas heating section to an inlet of said burner section; and
an oxygen gas stream supply line from an oxygen supply unit to said burner section. Preferably the method gives as modified plant a nitric acid production section and/or nitric acid production plant as described herein.

In a preferred embodiment, the method further comprising adding a water electrolysis unit as said oxygen supply unit, and a flow line for $H_2$ feed to an $NH_3$ plant comprised in said nitric acid production plant.

Preferably the existing plant comprises a tail gas treatment section, preferably as described herein, and a gas flow line from a heater of the tail gas heating section to an inlet of the tail gas treatment section, in particular wherein the tail gas treatment section comprises an abatement reactor comprising catalytic beds as described herein. Preferably the method involves providing a flow control element, such as a divider, in said gas flow line. The flow control element has a first outlet fluidly connected to the tail gas treatment section and a second outlet fluidly connected to the burner. Preferably the flow control element is configured for dividing the gas stream over the first and second outlet in an adjustable way. The flow control element may for instance comprise a three way valve.

Advantageously this method of modifying an existing plant provides for minimum modifications of the existing plant while integrating for instance with a water electrolysis unit, with low capital expenditure and with few changes on the process side such as for cooling of the burner gas.

FIG. 1 illustrates an example nitric acid production process and nitric acid production section according to the invention. The nitric acid production section (100) comprises a burner section (1), a cooling/condensation section (2) and an absorption section (3). The absorption section has an outlet for a tail gas stream (4). An oxygen gas stream (5) comprising at least 90 vol. % $O_2$ is supplied from one or more oxygen supply units (6), for instance from a water electrolyser. At least a part of the tail gas stream (4) is heated in a tail gas heating section (7) to give a heated tail gas stream (8). At least a part of the heated tail gas stream (8) is supplied to the burner section (1) together with the oxygen gas stream (5) and ammonia feedstock (9). Only a part of the tail gas is both heated and recycled to the burner section in preferred embodiments.

Preferably also air (11) is supplied to the burner. Preferably the air (11) and the ammonia (9) are mixed to give a first mixed gas stream and preferably the oxygen gas stream (5) and the heated tail gas (8) are mixed to give a second mixed gas stream and the first and second mixed gas stream are mixed and supplied to the burner. Preferably the second mixed gas stream has an oxygen concentration in the range of 10-30 vol. %, such as about 20 vol. % and/or a $N_2$ concentration in the range of 70-90 vol. %. The $N_2/O_2$ ratio of the second mixed gas stream can be adjusted by the mixing ratio of the component gas streams i.e. the oxygen gas stream and the heated tail gas. Thereby advantageously the $N_2/O_2$ ratio of the second mixed gas stream is similar to air and substitutes for air (11).

Hot gas is supplied from the burner section (1) to the cooling/condensation section (2). The cooling/condensation section (2) optionally comprises a low pressure section, a compressor, and a high pressure section in a dual pressure embodiment. One or more streams (10) with cooled gas and condensate are supplied from the cooling/condensation section (2) to the absorption section (3), preferably as a separate condensate stream and gas stream.

Preferably an aqueous liquid (15) is supplied to an upper part of the absorption section (3) and a nitric acid comprising liquid stream (16) is withdrawn from a bottom part of the absorption section (3) and is for instance supplied to a bleacher.

The nitric acid production section (100) comprises a tail gas treatment section (13) and a flow line (12) for supplying tail gas to the tail gas treatment section (13).

Preferably a first part (4) of the tail gas stream is heated and supplied to the burner section (1). Preferably a second part (12) of said tail gas stream is supplied to a tail gas treatment section (13).

In some embodiments, the plant comprises a gas flow line (8) for heated tail gas from a tail gas heating section (7) to the burner section (1) and one or more flow lines from the group consisting of a gas flow line (12) for heated tail gas from the tail gas heating section (7) to a tail gas treatment section (13) and a gas flow line (14) for unheated or less tail gas to the burner section (1). The gas flow line (14) in particular bypasses at least one heat exchanger that is included in the gas flow line for the first part (4) of the tail gas through the tail gas heating section (7).

Figure 2:
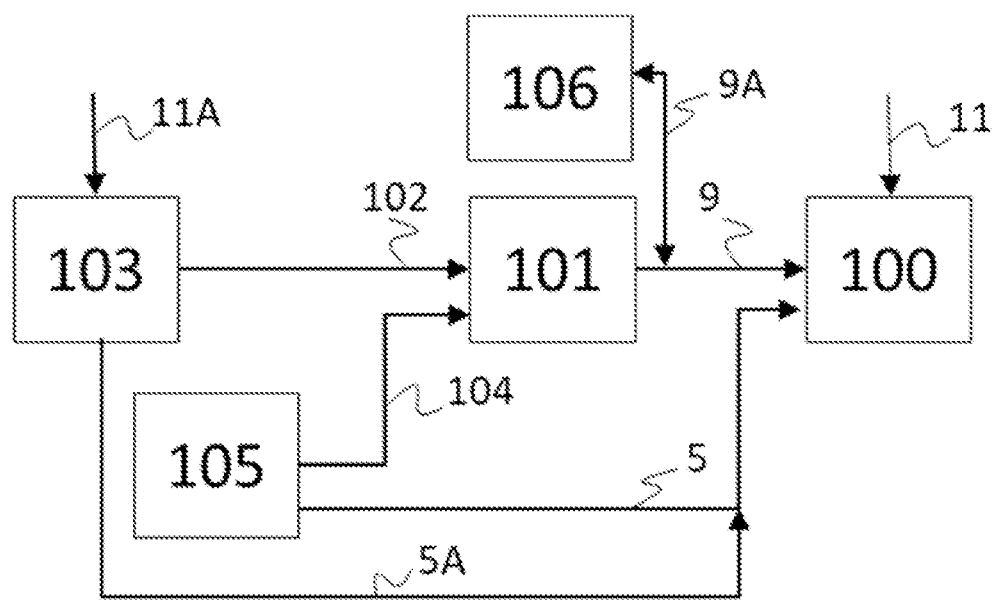
FIG. 2 illustrates an example nitric acid production plant according to the invention.

FIG. 2 illustrates an example nitric acid production plant comprising the nitric acid production section (100), and an ammonia plant (101), an air separation unit (103) (ASU) and a water electrolysis unit (105). The water electrolysis unit (105) has an outlet (5) for oxygen connected to the oxygen gas stream supply line and an outlet (104) for $H_2$ connected to an inlet of the ammonia plant (101). The ASU (103) has an outlet (102) for $N_2$ connected to an inlet of the ammonia plant (101). The ammonia plant has an outlet (9) for $NH_3$ connected to an inlet of the burner section (1) comprised in nitric acid production section (100). The plant further optionally comprises an $O_2$ supply line (5A) from the ASU (103) to the burner section (1). The plant comprises a second air supply line (11A) to the ASU. The plant optionally comprises an $NH_3$ storage unit (106) and an ammonia supply line (9A) from the ammonia plant to the storage unit (106) and from the storage unit to the nitric acid production section (100).

Preferences for the plant also apply for the process. Preferences for the process also apply for the plant. The process is preferably carried out in a plant as described. Preferences for the plant also apply for the method of modifying an existing nitric acid production plant. The method preferably gives the inventive plant.

The abbreviation 'bara' indicates bar absolute. Pressure are absolute pressures unless indicates otherwise. The expressions 'typically' and 'generally' indicate features that are often used but that are not mandatory.

In conclusion, the disclosure pertains to a nitric acid production process and plant. The process involves supplying an oxygen gas stream and ammonia feedstock to the burner section. In embodiments, a part of the tail gas stream is heated in a tail gas heating section and supplied to the burner section.

Figure 3:
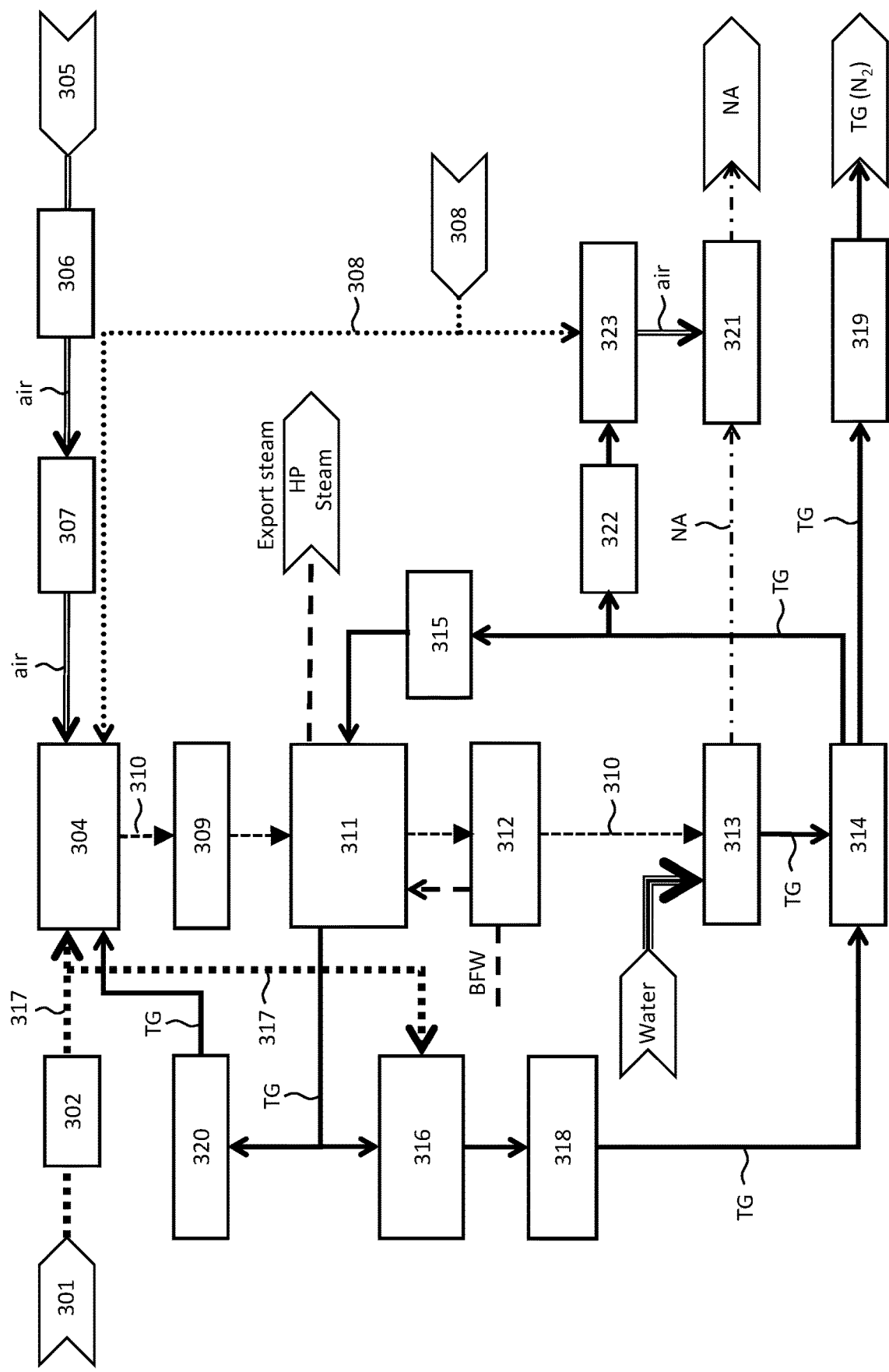
FIG. 3 shows an example of mono pressure nitric acid (NA) production process according to the invention, involving the heating of tail gas (TG).

FIG. 3 shows an example mono pressure nitric acid (NA) production process according to the invention, involving the heating of tail gas (TG).

Ammonia (301) is supplied through an evaporator/superheater (302) in a part (303) to a mixing unit (304). Air (305) is supplied through an air heater (306) and an air compressor (307) to the mixing unit (304). An oxygen stream (308), e.g. with at least 99 vol. % purity and e.g. supplied by an electrolyser, is also supplied to the mixing unit (304). The mixture from the mixing unit (304) is supplied to an $NH_3$ burner (309) and the resulting burner gas (310) is sent to an oxidation/absorption tower (313), after having been cooled down by producing superheated steam and heating up tail gas in a tail gas heater (311) and by means of boiler feed water (BFW) in a cooler condenser (312). The boiler feed water from the cooler condenser (312) is further supplied to the tail gas heater (311).

Said tail gas heater (311) is positioned as a final tail gas heater. Initially, tail gas from the oxidation/absorption tower (313) is heated in a first tail gas heater (314) followed by a steam heater (315) from about 25-35° C. to about 135° C.

Tail gas from said further heater (315) is supplied for a first part to the aforementioned final tail gas heater (311) in heat exchange with burner gas (310); this results in heating the tail gas from, e.g., about 135° C. to about 480° C. A part of the tail gas from the final tail gas heater (311) is supplied to an abatement unit (316), which also receives some $NH_3$ (317). The fraction of the tail gas from the final tail gas heater (311) that is supplied to the abatement unit (316) can be varied, depending on the relative amount of oxygen stream (308) to air (305).

The abatement unit contains catalyst(s) for $N_2O$ abatement; and has e.g. no inlet for natural gas or fuel. Treated tail gas from the abatement unit (316) is expanded in an expander (318) and supplied, through the first tail gas heater (314), to a stack (319) for venting. Another part of the tail gas from the final tail gas heater (311) is combined with a second part of the tail gas from the steam heater (315). This second part bypasses the final tail gas heater (311). The combined tail gas stream is compressed in a first tail gas compressor (320) and recycled to the mixing unit (304).

Nitric acid from the oxidation/absorption tower (313) is supplied to a bleaching section (321) that is provided e.g. at the bottom of the tower. A part of the tail gas from the first tail gas heater (314) and optionally also from the oxidation / absorption tower (313) is compressed in a second tail gas compressor (322) and mixed with a part of the oxygen stream (308) in a second mixing unit (323). The resulting gas mixture, having a temperature of e.g. about 55° C. to about 60° C., is used in the bleaching section (321).

The invention claimed is:

1. A nitric acid production process carried out in a nitric acid production section, wherein the nitric acid production section comprises a burner section, a cooling/condensation section and an absorption section having an outlet for a tail gas stream, the process comprising:
 a) providing an oxygen gas stream comprising at least 90 vol. % $O_2$ from one or more oxygen supply units;
 b) supplying said oxygen gas stream and ammonia feedstock to said burner section; and
 c) wherein a first part of said tail gas stream is heated in a tail gas heating section to give a heated tail gas stream and supplied to said burner section;
 wherein a second part of said tail gas stream is heated in said tail gas heating section and supplied to a tail gas treatment section comprising a catalyst bed, wherein the plant comprises an air supply line for supplying air to said burner section, and wherein the temperature of the heated first part of said tail gas stream is reduced, and the first part of said tail gas stream is thereafter supplied to said burner section.

2. A process according to claim 1, wherein step b) involves reacting oxygen and ammonia in said burner section thereby forming a burner gas stream, wherein said heating in said tail gas heating section of said first part and said second part of the tail gas stream involves heat exchange against the burner gas stream, and wherein the second part of said tail gas stream is supplied from said tail gas heating section at a temperature of at least 350° C. to said tail gas treatment section.

3. A process according to claim 1, wherein said oxygen supply unit comprises an electrolyser.

4. A process according to claim 1, wherein said oxygen supply unit comprises an air separation unit.

5. A process according to claim 1, comprising supplying said ammonia feedstock from an ammonia plant and supplying $N_2$ feed to said ammonia plant from an air separation unit.

6. A process according to claim 5, further comprising supplying $H_2$ feed from a water electrolysis unit to said ammonia plant and using oxygen produced in said water electrolysis unit as said oxygen gas stream.

7. A process according to claim 1, wherein in step c) said oxygen gas stream is mixed with at least a part of said heated tail gas stream to form a mixed gas stream and said mixed gas stream is mixed with at least said ammonia feedstock and supplied to said burner section.

8. A process according to claim 1, wherein furthermore a second tail gas stream having a lower temperature than the heated tail gas stream is supplied to said burner section.

9. A process according to claim 1, wherein the tail gas treatment section comprises catalytic beds for $N_2O$ and $NO_x$ removal, wherein both said first and said second part of said tail gas are heated in said tail gas heating section.

10. A nitric acid production plant comprising a nitric acid production section comprising a burner section, a cooling/condensation section and an absorption section having an outlet for a tail gas stream, wherein the nitric acid production plant further comprises a first flow line for tail gas from said absorption section to an inlet of said burner section through at least one heater of a tail gas heating section, and an oxygen gas stream supply line from one or more oxygen supply units to said burner section, and a second flow line for tail gas from said absorption section to a tail gas treatment section wherein said second flow line for tail gas passes through said tail gas heating section, wherein the tail gas treatment section comprises a catalyst bed, and the plant comprises a gas flow line from the absorption section to the burner section that bypasses at least one heat exchanger that is included in the gas flow line of the first part of the tail gas through the tail gas heating section, wherein the plant further comprises an air supply line comprising an air compressor to said burner section.

11. A plant according to claim 10, further comprising an ammonia plant, an air separation unit and a water electrolysis unit, wherein the water electrolysis unit has an outlet for oxygen connected to said oxygen gas stream supply line and an outlet for $H_2$ connected to an inlet of said ammonia plant, wherein the air separation unit has an outlet for $N_2$ connected to an inlet of said ammonia plant, and wherein the ammonia plant has an outlet for $NH_3$ connected to an inlet of said burner section comprised in said nitric acid production section.

12. A method of modifying an existing nitric acid production plant, the existing nitric acid production plant comprising a burner section, a cooling/condensation section, an absorption section having an outlet for a tail gas stream, a tail gas heating section and a flow line for tail gas from said absorption section to a tail gas treatment section, and an air supply line comprising an air compressor to said burner section;

the method comprising adding to said plant:
a flow line for tail gas from said absorption section to an inlet of said burner section through at least one heater of a tail gas heating section; and
an oxygen gas stream supply line from one or more oxygen supply units to said burner section; wherein said second flow line for tail gas passes through said tail gas heating section, wherein the tail gas treatment section comprises a catalyst bed, and the method comprises adding a gas flow line from the absorption section to the burner section that bypasses at least one heat exchanger that is included in the gas flow line of the first part of the tail gas through the tail gas heating section; giving a nitric acid production section as defined in claim 10.

13. A method according to claim 12, the method further comprising adding a water electrolysis unit as said oxygen supply unit, and a flow line for $H_2$ feed from the water electrolysis unit to an $NH_3$ plant comprised in said nitric acid production plant.

* * * * *